(12) United States Patent  
Glass

(10) Patent No.: US 7,167,156 B1  
(45) Date of Patent: Jan. 23, 2007

(54) ELECTROWETTING DISPLAY

(75) Inventor: Thomas R. Glass, Idaho City, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/258,743

(22) Filed: Feb. 26, 1999

(51) Int. Cl.  
*G09G 3/34* (2006.01)

(52) U.S. Cl. ................................. 345/107; 359/253

(58) Field of Classification Search ............... 345/60, 345/61, 71, 106–107; 359/240, 237, 238, 359/242, 253, 263  
See application file for complete search history.

(56) References Cited

U.S. PATENT DOCUMENTS

| | | | | |
|---|---|---|---|---|
| 4,359,698 A | * | 11/1982 | Lambe et al. | ......... 359/240 |
| 4,383,255 A | * | 5/1983 | Grandjean et al. | |
| 4,583,824 A | * | 4/1986 | Lea | |
| 5,479,278 A | * | 12/1995 | Takeuchi et al. | |
| 5,731,792 A | * | 3/1998 | Sheridon | ............ 345/84 |
| 6,176,752 B1 | * | 1/2001 | Tjaden et al. | |

OTHER PUBLICATIONS

Beni, G., et al., "Continuous electrowetting effect", *Appl. Phys. Lett.* 40(10, pp. 912-914, (May 1982).
Beni, G., et al., "Dynamics of electrowetting displays", *J. Appl. Phys.*, 52(10), pp. 6011-6015, (Oct. 1981).
Beni, G., et al., "Electro-wetting displays", *Appl. Phys. Lett.*, 38(4), pp. 207-209, (Feb. 1981).
Colgate, E., et al., "An investigation of electrowetting-based microactuation", *J. Vac. Sci. Technol.*, A 8(4), pp. 3625-3633, (1990).
Dolino, G., et al., "Adsorption strains in porous silicon", *Physical Review B*, 54(24), The American Society, pp. 17919-17929, (1996).
Jackel, J.L., et al., "Electrowetting optical switch", *Appl. Phys. Lett.*, 40(1), pp. 4-5, (Jan. 1982).
Jackel, J.L., et al., "Electrowetting switch for multimode optical fibers", *Applied Optics*, 22(11), pp. 1765-1770, (Jun. 1983).
Matsumoto, H., et al., "Preliminary Investigation of Micropumping Based on Electrical Control of Interfacial Tension", *IEEE*, pp. 105-110, (1990).

\* cited by examiner

*Primary Examiner*—Kent Chang  
(74) *Attorney, Agent, or Firm*—Schwegman, Lundberg, Woessner & Kluth, P.A.

(57) ABSTRACT

The present invention comprises construction of a display from display elements that are actuated using the physical principle of electrowetting. In one embodiment, pores within porous silicon are filled with an ionic and an optically reflective electronic conductor, and actuated by application of an electric potential across the pore. An image is then formed on an array of such pores by applying an appropriate voltage to each pore of the array to create an optical image in the light reflected off the electronic conductors. Such a display may be constructed to have very high resolution, making it desirable for creating real-time holographic images, or for creating high-resolution mask images for use in photolithography.

15 Claims, 2 Drawing Sheets

ELECTROWETTING DISPLAY

FIELD OF THE INVENTION

The invention relates generally to an electronic display apparatus, and specifically to use of electrowetting to actuate pixels in a display.

BACKGROUND OF THE INVENTION

A number of display types exist for the purpose of physically displaying a representation of an image formed electronically, such as on a computer. Standard Cathode-Ray Tube (CRT) displays are the most common, but are supplemented by technologies such as Liquid Crystal Display (LCD) and gas plasma display when space is a concern. Each of these display types has characteristics that are advantageous for certain applications, but all share certain characteristics that limit the use of electronic displays to certain applications.

A standard CRT display used with most personal computer systems receives three signals of varying intensity, each representing one of the colors red, green, and blue. The strength of each signal controls the intensity of an electron stream produced by an electron gun within the CRT. The electron streams are focused and aimed by a magnetic deflection apparatus, which receives signals from the video source that control the deflection apparatus to sweep each electron beam from side to side in a pattern that crosses and moves down the screen. The beams pass through a shadow mask, a metal plate comprising a number of small holes or slots, used to keep the electron beams precisely focused on the target. The beams then strike phosphor which coats the inside of the screen, and create a visible image. Separate phosphors exist for each of the three colors, and glow with intensity proportional to the intensity of the striking electron beam. This CRT apparatus is well-understood and relatively inexpensive, but is physically large in size, and its resolution is limited by the slot mask and screen phosphor geometry.

A popular alternative is a Liquid Crystal Display (LCD). Such a display operates by first generating light from a fluorescent panel near the back of the display. A polarizing filter in front of the light panel passes only those light waves that are vibrating in or near a particular plane, most commonly horizontal. The polarized light then passes through a layer of liquid crystal cells. Each of the cells may be electronically activated by varying voltages, such that a cell receiving no voltage has no twist in the crystal structure of the liquid crystal cell, while a cell receiving a high voltage has about 90 degrees of twist in the crystal structure of the liquid crystal cell. Polarized light entering the rear of the cells follows the structure of the liquid crystal, turning up to 90 degrees in orientation with the twist in the crystal structure. The light then passes through a color filter that is either red, blue, or green, and through a second polarizing filter oriented at 90 degrees rotated from the first polarizing filter. Light that is not oriented essentially in the same plane as the second polarizing filter is attenuated, and light that vibrates at 90 degrees from the orientation of the second filter is blocked almost completely. Therefore, by varying the voltage applied to the liquid crystal cell, the light transmitted through the display is varied proportionately, and an array of such devices is used to produce an image. Such a display can be quite flat, but resolution is again limited by the physical size of the polarizing and color filters, and the liquid crystal cell.

Other display mechanisms exist, but most have some physical attribute that limits the resolution displayable by the apparatus. What is needed is a display apparatus that allows real-time creation of very high-resolution images.

SUMMARY

The present invention comprises construction of a display from display elements that are actuated using the physical principle of electrowetting. In one embodiment, pores within porous silicon are filled with an ionic and an optically reflective electronic conductor, and actuated by application of an electric potential across the pore. An image is then formed on an array of such pores by applying an appropriate voltage to each pore of the array to create an optical image in the light reflected off the electronic conductors. Such a display may be constructed to have very high resolution, making it desirable for creating real-time holographic images, or for creating high-resolution mask images for use in photolithography.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention comprises use of electrowetting principles in porous silicon to create a display apparatus. The display apparatus is controlled by an electronic control matrix, which creates an electric potential across selected silicon pores to actuate the display elements. Each display element contains an electronic conductive liquid and an ionic conductive liquid, such that electrowetting principles cause the electronic conductive liquid to shift from end to end in the pore when a potential gradient is present across the pore.

Electrowetting is a physical phenomena in which an applied electrical potential introduces interfacial surface tension change in a liquid, causing the liquid to flow. In one embodiment, a mercury slug serves as the electronic conductive liquid and saltwater serves as the ionic conductive liquid, and a potential gradient between the ends of a cylindrical pore in silicon causes actuation and movement of the mercury slug. The exact composition of the saltwater is not critical, but should be sufficient to facilitate movement in a potential field.

Figure 1:
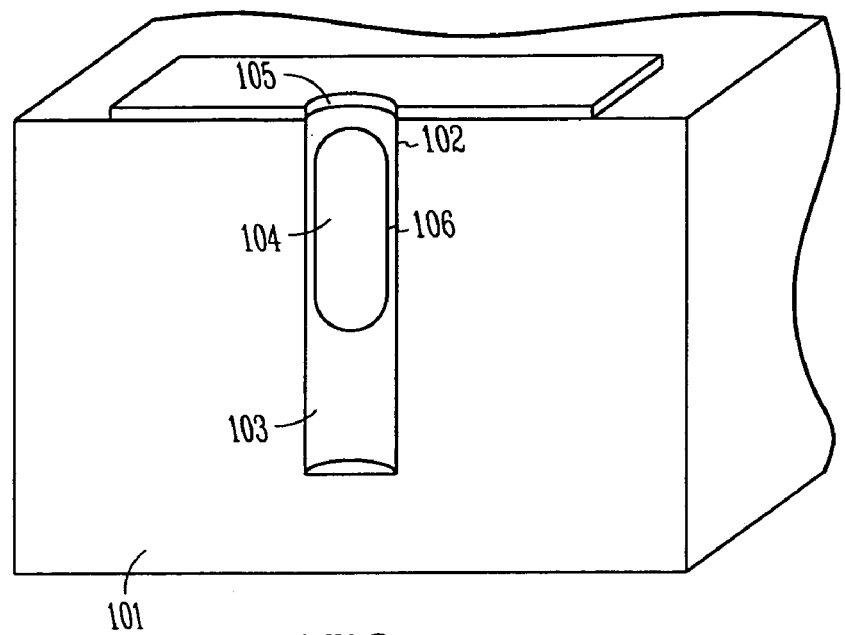
FIG. 1 illustrates a cutaway view of an electrowetting-actuated element in porous silicon, consistent with an embodiment of the present invention.

FIG. 1 is a cross section view which illustrates one embodiment of an electrowetting element as is consistent with a display element of the present invention. The element 100 comprises an individual pore in a pourous insulating substrate 101. The pore extends into the substrate from a first surface 110. The first surface can be flat, or contain some surface variations. In the embodiment illustrated, the pore terminates in the substrate without extending through the complete substrate. It will be appreciated, however, that the pore can extend through the complete substrate. Also, for illustrative purposes one pore is shown in FIG. 1, however, the display will contain numerous pores. These pores can be arranged in a standard square, or rectangular, array, or can be fabricated in an other predefined pattern.

To increase surface resistance of the pore, the interior surface of the pore can be lightly oxidized. Alternatively, the substrate can be comprised of polysilicon, or other nonconductive material. The insulating substrate contains a number of cylindrical pores 102, each of which are injected with an ionic conductor fluid 103 and a reflective electronic conductor 104. In one embodiment, the electronic conductor 104 is mercury and the ionic conductor 103 is saltwater. The pore containing the ionic and electronic conductors is sealed with a transparent seal 105, which may be a transparent metallic conductive composition such as Indium tin oxide. An external light source (not shown) can be employed in one embodiment to provide light which reflects off the reflective electronic conductor of each display element. Alternatively, ambient light from the operating environment of the display is reflected off the reflective electronic conductor of each display element to form an image.

In operation, a voltage applied at one end of a display element as pictured in FIG. 1 creates an electric potential across the pore 102, and causes the electronic conductor 104 to move within the pore. For example, if a voltage is applied to the pore seal 105 comprising Indium tin oxide, a voltage gradient will be present between the sealed top of the pore and the bottom of the pore. A narrow gap 106, on the order of 10 Angstroms to 10 microns in one embodiment, exists between the pore wall and the electronic conductor 104, and is filled by the ionic conductor. Because the gap is narrow, the resistance of the ionic conductor is substantial in the gap region. Therefore, a voltage gradient between the two ends of the silicon pore results in a substantial voltage drop across the mercury slug. Because of this voltage drop, a surface tension gradient is present within the gap region 106, creating an electrowetting pressure gradient along the ionic conductor in the gap. This causes the ionic conductor to attempt to move relative to the electronic conductor, but because the ends of the tube are sealed, the flow of the ionic conductor in one direction across the gap 106 causes the electronic conductor 104 to move in an opposite direction. Therefore, a potential gradient applied across the pore element of FIG. 1 causes a change in the position of the electronic conductor within the pore. This effect is known as electrowetting, and is used in one embodiment to move reflective mercury slugs serving as electronic conductors within a number of display elements as shown in FIG. 1 to create an optical image.

Figure 2:
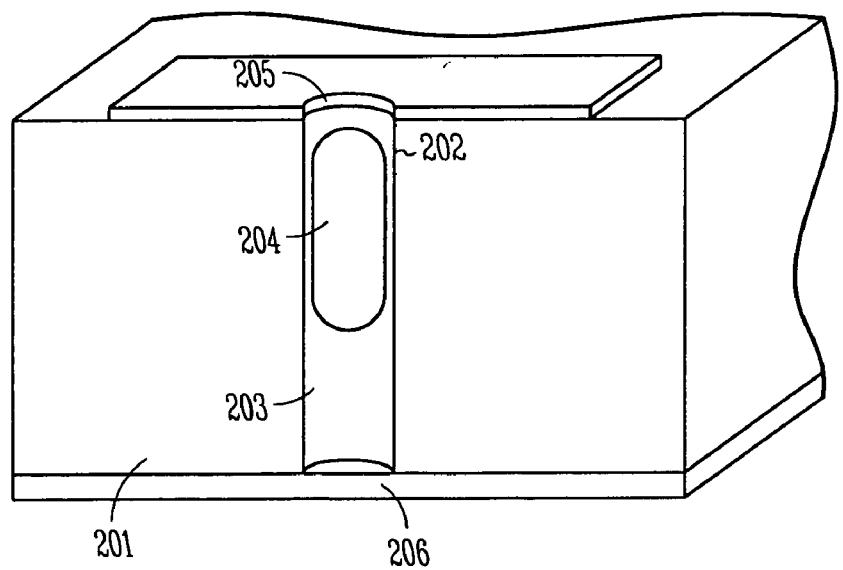
FIG. 2 shows a cutaway view of an alternate embodiment of an electrowetting-actuated display element in porous silicon, consistent with an embodiment of the present invention.

Alternatively, the pores may be constructed as shown in FIG. 2. Here, silicon or another nonconductive material 201 again contains a number of pores 202. The pores extend through the substrate and are capped at both ends, as explained. Each pore contains an electronic conductor 204 and an ionic conductor 203, and is sealed with a transparent metallic seal 205, similar to the pore element of FIG. 1 discussed previously. The pore display element of FIG. 2 additionally includes a conductive material 206, sealing the end of the pore opposite the seal 205. The conductive material 206 may be maintained at a stable potential, such that a positive or negative voltage applied at the top seal 205 will cause movement of the electronic conductor 204. The conductive material sealing the bottom of each pore may in another embodiment be matrix-addressable such that the voltage at the bottom of the selected pore may be varied in addition to varying the voltage applied at the top of such element. Alternatively, the top seal 205 of each pore may be maintained at a constant potential, and the potential at the conductive material 206 at the bottom of selected pores may be varied to actuate selected pore display elements. It should be noted that the bottom conductive material 206 as illustrated in FIG. 2 need not be transparent, although the conductive material 205 at the top of each pore should be somewhat transparent, because the electronic conductive element 204 within each pore must be visible from one side of the pore to reflect light and so create an optical display.

Figure 3:
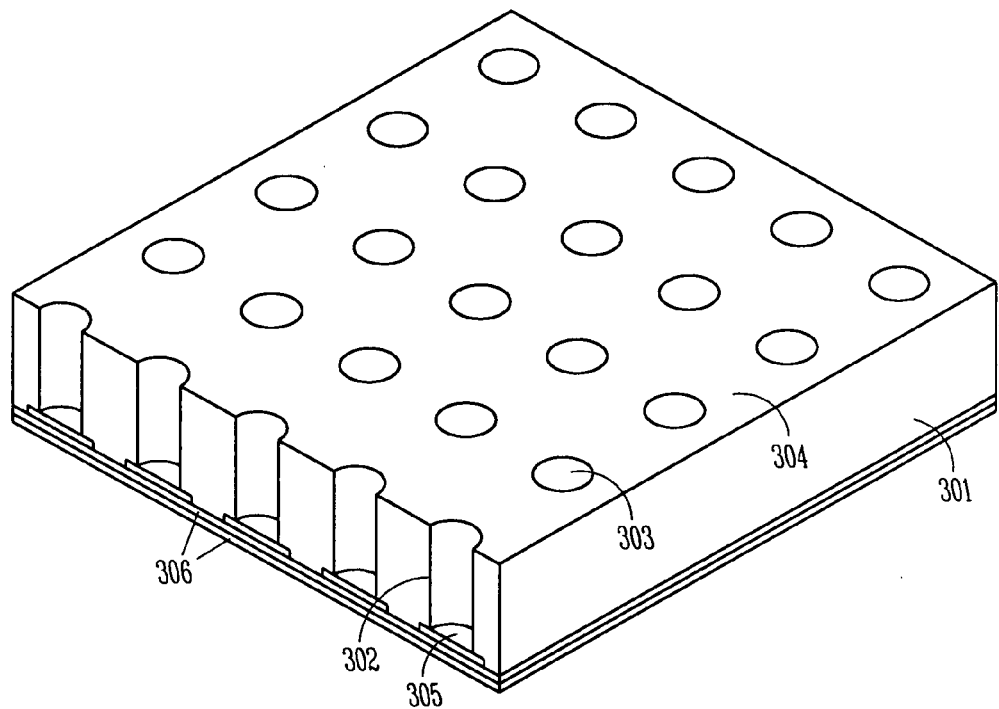
FIG. 3 shows a display apparatus comprising a matrix of display elements, consistent with an embodiment of the present invention.

In FIG. 3, an illustration of a matrix of electrowetting display elements is shown. A nonconductive material such as silicon is used as a substrate 301 into which the pores 302 are formed. The top of the pores of one embodiment are sealed with a cap 303 made with a transparent conductive material such as Indium tin oxide. The caps of one embodiment are connected electronically as shown at 204 so that a specific potential may be applied to the top of each display element. The bottom of each pore is similarly sealed with a cap 305 that comprises a conductive material. The bottom cap of this embodiment is connected to digital logic in multiple semiconductor layers 306 that is operable to alter the potential of the bottom cap of each pore. In such an embodiment, the conductive top cap 203 may be held at a constant potential, such as ground.

Figure 4:
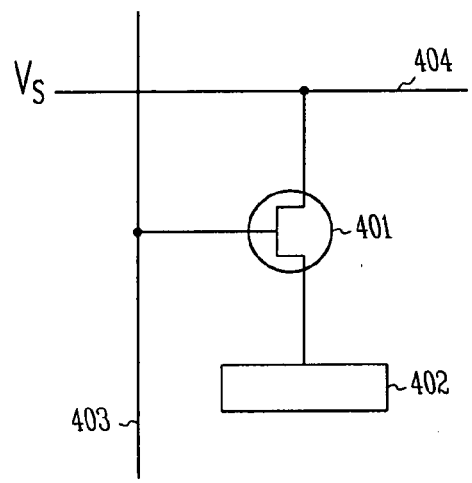
FIG. 4 shows a circuit diagram of a portion of a display element matrix actuation circuit, consistent with an embodiment of the present invention.

One possible circuit for altering the potential of the bottom cap of each display element pore is shown in FIG. 4. Here, a transistor 401 is connected to the bottom pad 402 of a display element, and is switched by a row select line 403. A specific voltage is applied to a column select line 404, depending on the desired movement of the electrowetting electronic conductive element in the pore associated with the bottom pore seal 402. In operation, the apparatus of FIG. 4 operates much like a traditional memory cell, except that a single element is addressed at a time. A single row select line 403 is energized, turning on all transistors in the row. Also, a selected voltage is applied to a single column select lime 404, which is then conducted through the switched transistor 401 and applied to the bottom conductive pore seal 402, actuating the display element.

In a further embodiment, a selected voltage may be applied to each of several column select lines 404 while a single row select line 403 is energized, allowing an entire row of pores to be actuated at the same time, each to an independently selected position. Because a different voltage may be applied to each of the column select lines simultaneously while a voltage is applied to a single row select line, each element activated by the energized row select line 403 and switched transistor 401 is independently actuated.

Figure 5:
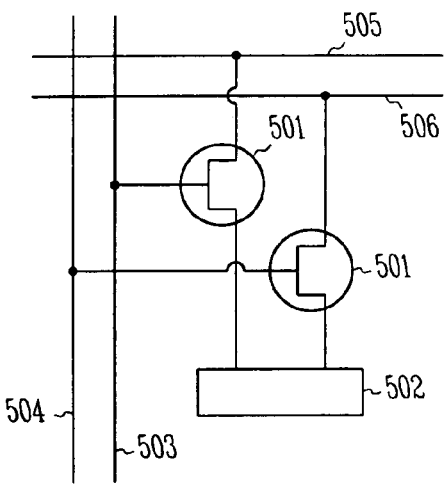
FIG. 5 shows an alternate circuit diagram of a portion of a display element matrix actuation circuit, consistent with an embodiment of the present invention.

FIG. 5 illustrates an alternate embodiment of semiconductor logic to actuate the individual display elements in a matrix such as is shown in FIG. 3. Here, multiple transistors 501 are connected to a single bottom pore seal 502. Each transistor 501 is switched by a separate row select line 503 or 504, and conducts a separate signal supplied by column select line 505 or 506 to the bottom pore seal 502 when switched on. In operation, a positive voltage is applied to one column select line and a negative voltage is applied to the other row select line, and the appropriate polarity column select line voltage to move the electronic conductor of the display element in the desired direction is applied to the bottom conductive pore seal 502 by energizing the appropriate one of the two row select lines 503 and 504.

An array of electrowetting display elements as pictured in FIG. 3 may be employed to create an image for a number of purposes, some of which are uniquely suited to a display with a very fine resolution. For example, if the array of FIG. 3 is constructed at a resolution of 1000 lines per millimeter or greater, holography becomes possible, making a real-time 3-dimensional display feasible. Also, real-time creation of images with extremely fine optical detail is possible, such as the high-resolution images needed for semiconductor lithography. An electrowetting display apparatus provides an advantage when used as a mask image source for semiconductor lithography in that rapid changes can be made to the mask layout, without undergoing complex or time-consuming printing and optical mask generation processes.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed:

1. A display comprising:
    a substrate comprised of an insulating material having a first surface, and a plurality of pores extending into the substrate from the first surface;
    an electronic conductive liquid, deposited within the pores of the substrate;
    an ionic conductive liquid, deposited within the pores of the substrate; and
    one or more electronic conductors connected to a top or bottom of each of said pores, operable by application of electric potential to cause the electronic conductive liquid to change position within each pore.

2. The display of claim 1 wherein the substrate comprises porous silicon.

3. The display of claim 2 where an interior surface of the pores is oxidized to increase surface resistance.

4. The display of claim 1 wherein the electronic conductive liquid is mercury.

5. The display of claim 1 wherein the ionic conductive liquid is saltwater.

6. The display of claim 1 wherein the substrate is porous polysilicon.

7. A holographic display operable to display a hologram of a three-dimensional image comprising:
    a substrate comprised of an insulating material having at least one flat surface, and a plurality of pores extending from the flat surface therein, such that the pores form a matrix of pores with at least 1000 lines of pores per millimeter;
    an electronic conductive liquid, deposited within the pores of the substrate;
    an ionic conductive liquid, deposited within the pores of the substrate; and
    one or more electronic conductors connected to a top or bottom of each of said pores, operable by application of electric potential to cause the electronic conductive liquid to change position within each pore.

8. The holographic display of claim 7 wherein the substrate comprises porous silicon, and wherein an interior surface of the pores is oxidized to increase surface resistance.

9. The holographic display of claim 7 wherein the substrate comprises polysilicon.

10. The holographic display of claim 7 wherein the ionic conductive liquid is saltwater.

11. The holographic display of claim 7 wherein the electronic conductive liquid is mercury.

12. An integrated circuit comprising:
    a substrate comprised of an insulating material having at least one flat surface, and a plurality of pores extending from the flat surface therein;
    an electronic conductive liquid, deposited within the pores of the substrate;
    an ionic conductive liquid, deposited within the pores of the substrate;
    one or more electronic conductors connected to a top or bottom of each of said pores, operable by application of electric potential to cause the electronic conductive liquid to change position within each pore; and
    electronic circuitry operable to apply an electric potential across a selected pore or group of pores.

13. The integrated circuit of claim 12 wherein the electronic circuitry is operable to select each of the plurality of pores sequentially and apply an electric potential to the selected pore.

14. The integrated circuit of claim 13 wherein the electronic circuitry selects a pore and applies an electric potential to the pore by:
    applying voltage to a row select line from a plurality of row select lines in a matrix, such that the voltage turns a row of transistors connected to the row select line on;
    applying a voltage to a column select line from a plurality of column select lines in a matrix where each column select line is connected to a column of transistors, such that each column select line is connected to at least one transistor connected to each of the row select lines; and
    conducting the voltage applied to the column select line to a conductive pore seal of the selected pore through each transistor that both is connected to the column select line with voltage applied and is turned on by application of voltage to a row select line.

15. The integrated circuit of claim 13 wherein the electronic circuitry selects a pore and applies an electric potential to the pore by:
    applying a voltage to a positive or a negative row select line of a pair of row select lines, where the positive row select line is connected to a row of positive transistors and the negative row select line is connected to a row of negative transistors and a voltage applied to the positive row select line turns on the connected positive transistors and a voltage applied to the negative row select line turns on the negative transistors;
    applying a positive voltage to a positive column select line and a negative voltage to a negative column select line of a pair of column select lines, where the positive row select line is connected to a column of positive transistors and the negative row select line is connected to a column of negative transistors, such that each pair of column select lines are connected to at least one pair of positive and negative resistors connected to each pair of row select lines; and conducting the voltage applied to the positive column select line through a positive transistor that both is connected to the positive column select line and is turned on by application of voltage to a positive row select line, or conducting the voltage applied to the negative column select line through a negative transistor that both is connected to the negative column select line and is turned on by application of voltage to a negative row select line, such that the applied voltage is conducted to a conductive pore seal of the selected pore.

* * * * *

UNITED STATES PATENT AND TRADEMARK OFFICE
CERTIFICATE OF CORRECTION

PATENT NO.         : 7,167,156 B1                                           Page 1 of 1
APPLICATION NO.    : 09/258743
DATED              : January 23, 2007
INVENTOR(S)        : Glass It is certified that error appears in the above-identified patent and that said Letters Patent is hereby corrected as shown below:

In column 3, line 12, delete "pourous" and insert -- porous --, therefor.

Signed and Sealed this

First Day of May, 2007

JON W. DUDAS
*Director of the United States Patent and Trademark Office*